July 5, 1960 W. H. INGRAM, JR., ET AL 2,943,682
WIRELINE CONTROL HEAD
Filed July 31, 1956 2 Sheets-Sheet 1
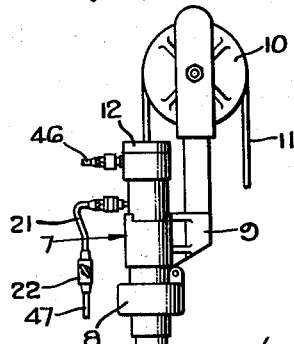
FIG. 1.
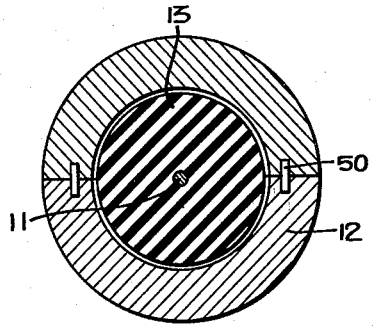
FIG. 2.
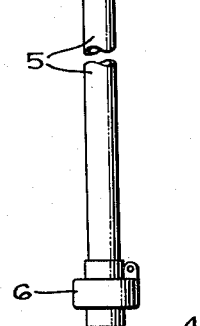
FIG. 3.
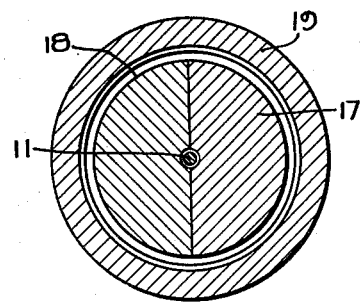
FIG. 4.
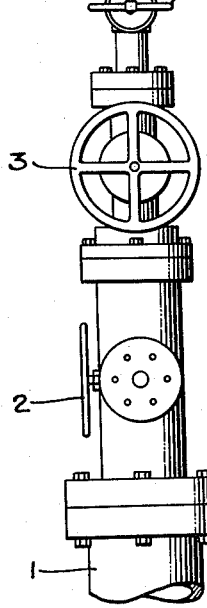
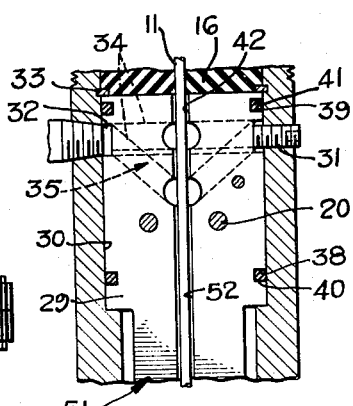
FIG. 9.
WILLIAM H. INGRAM,
CECIL B. GREER,
INVENTORS
BY F. Munro Redman
ATTORNEY

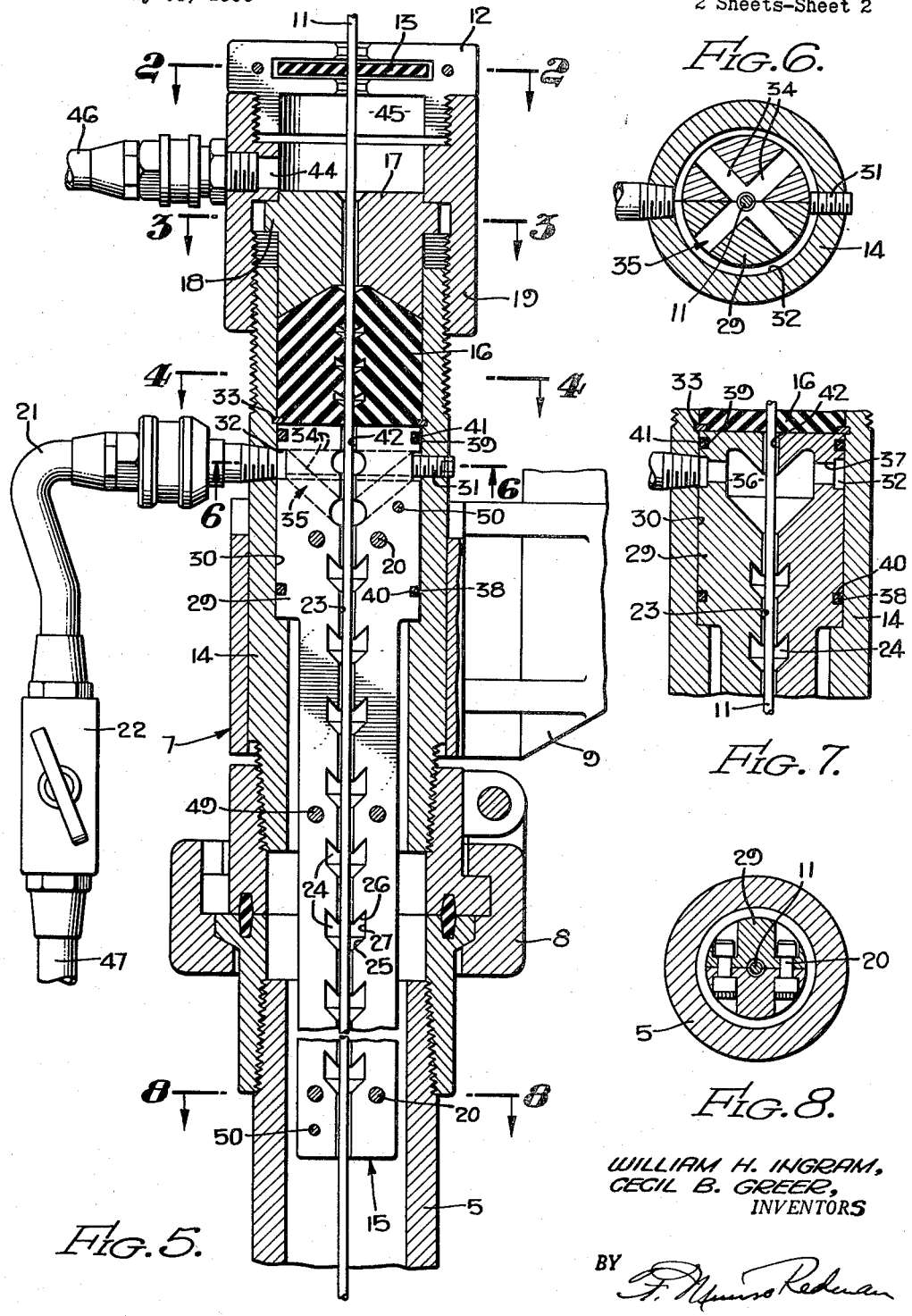

United States Patent Office 2,943,682
Patented July 5, 1960

2,943,682

WIRELINE CONTROL HEAD

William H. Ingram, Jr., Caracas, Venezuela, and Cecil B. Greer, Houston, Tex., assignors, by direct and mesne assignments, of one-half to Bowen Company of Texas, Inc., Houston, Tex., a corporation of Texas, and one-half to Dresser Industries, Inc., Dallas, Tex., a corporation of Delaware Filed Jan. 31, 1956, Ser. No. 562,551

15 Claims. (Cl. 166—77)

This invention relates generally to oil well head equipment, and more particularly to improvements in control head apparatus for permitting relatively friction-free passage into a well under pressure, of a wireline or cable such as may be used for lowering and raising various tools therein.

It is frequently necessary, after a well has been drilled and casing set and also after a well has been completed and has been on production, to carry out various service operations requiring that tools be run into such wells on suspension lines or cables against well pressures of substantial magnitude, and under such conditions it is essential to find means for preventing or controlling the escape of borehole fluid from the well during these operations. Retaining the borehole fluid, which may be gas, oil, drilling fluid or a combination of such components, during cable movement, is difficult even with a solid wireline, and becomes increasingly so where stranded cable is used.

Sealing means capable of preventing leakage about a suspension line entering a well under any fluid pressures likely to be encountered therein as long as such line remains motionless or fixed in position therein, or is being withdrawn from the well, are well known in the art. Rubber packing glands, stuffing boxes or similar sealing devices, some of which are known as "oil savers," or "line wipers" are commonly used under such conditions. These devices are usually capable of exerting sealing pressures around the line of substantially any value necessary to prevent leakage of fluid therethrough from the well. However, such sealing force applied around the line is accompanied by a correspondingly great frictional resistance to axial movement of the line or cable, which renders it impossible, in some cases, to run-in or withdraw tools successfully without the use of complicated and expensive equipment capable of applying large thrusting or pulling forces to the cable or line to overcome this frictional resistance. These thrusting or pulling forces are sometimes so high that the cable itself has been found to be damaged as it was forced through the line wiper or the like pack-off device. This has been particularly true of multi-layer stranded cables in which the outer layers of strands tend to "bird-cage" or slide longitudinally upon the inner layers, resulting in the formation of a cage or ball-like knot.

It is therefore a primary object of this invention to overcome the before-described disadvantages and difficulties associated with the wireline or cable sealing or pack-off devices heretofore commonly employed, by providing an improved device which overcomes the problem of escape of fluid from the well around the entering wireline or cable while at the same time eliminating substantially all of the frictional forces heretofore necessarily applied to the wireline or cable for preventing such escape of fluid.

A further object of the invention is, therefore, to afford improved means for lowering tools on a suspending line into a well borehole against high fluid pressure.

Another object is to afford means for, in effect, packing-off around a wireline or cable entering a borehole or well under pressure, without setting up frictional resistance to axial movement of the line or cable so great as to interfere with or prevent moving it when desired.

A still further object is to make possible the use of smaller diameter cables in high pressure wells and to reduce damage to and wear on said cables.

In addition to the frictional forces to which the wireline or cable may be subjected by the before-mentioned sealing devices, it is also subjected to forces, resulting from the well fluid pressures, tending to expel the line from the well. At times, particularly where the frictional forces upon the wireline or cable are substantially eliminated by the device of this invention as stated in the foregoing objects, well pressures are encountered which are sufficiently great to result in an uncontrolled expulsion of the wireline or cable from the well unless other suitable means are utilized for resisting and controlling such expulsive forces when it becomes desirable or necessary to do so.

It is therefore an additional object of this invention to provide means for reducing the frictional resistance offered by a sealing member to cable movement to a negligible amount while yet permitting a controlled braking effect upon the cable to be obtained when desired to control or prevent such expulsion of the cable from the well.

Yet another object is to minimize the need for expensive auxiliary equipment for feeding a line into a borehole against high pressure.

Another object is to reduce the number and weight of sinker bars required to lower and maintain tools against pressure, which makes possible the use of shorter lubricators.

A further object is to provide means for eliminating well fluid spray from the top of a lubricator, when retrieving a tool such as a swab on large diameter cable, in the absence of formation pressure in the well.

A related object is to effect savings of time, reduce the size and cost of equipment and obtain greater flexibility and convenience in oil well service operations.

The hereinbefore stated objects are attained, in general, by the present invention, which broadly resides in means for providing substantially friction-free passage of a wireline or cable into a well under pressure, such means utilizing an elongated flow tube through which the wireline or cable freely passes into the well, such flow tube being of such length and the inside diameter clearance about said wireline or cable being of such value as to permit an acceptably small, controlled blow-by of well fluid therethrough, thereby effecting a pressure drop therethrough equal to the gage pressure of the well fluid, without requiring any positive pack-off around the wireline. The objects are also accomplished by incorporating adjustable means for controlling or preventing expulsion of the wireline from the well by the well fluid pressure.

These and other objects and features of novelty of the present invention will become evident hereafter.

In the accompanying drawings wherein a preferred embodiment and best mode of carrying out the invention is illustrated:

Figure 1 is an elevational view of the general assembly of the apparatus of the invention as applied to a typical well casing head arrangement;

Figure 2 is a horizontal sectional view taken as indicated by line 2—2 of Figure 5;

Figure 3 is a horizontal sectional view taken as indicated by line 3—3 of Figure 5;

Figure 4 is a horizontal sectional view taken as indicated at 4—4 in Figure 5;

Figure 5 is a vertical sectional view in enlarged detail of the control head taken along line 5—5 of Figure 1;

Figure 6 is a horizontal sectional view taken as indicated by line 6—6 of Figure 5;

Figure 7 is a fragmentary vertical sectional view showing an alternative embodiment of a portion of the control head;

Figure 8 is a horizontal sectional view as indicated by line 8—8 in Figure 5; and Figure 9 is a fragmentary sectional view showing another alternative embodiment of a portion of the control head.

Referring first primarily to Figure 1, a typical installation of the apparatus of the invention as used on a well is illustrated, wherein a well casing head 1 has secured thereto a master valve 2 above which is mounted a main valve 3 which is in turn connected to a wireline sealing valve or blow-out preventer 4. A conventional lubricator 5 for use in tool insertion or removal under pressure, is connected by a quick release clamp 6 above the wireline sealing valve 4. To the upper end of lubricator 5 is connected the wireline control head apparatus comprising the present invention, and which is generally indicated at 7, using for such connection preferably a second quick release clamp 8. A sheave bracket 9 is secured about the control head 7, and extends upwardly to support rotatably a sheave wheel 10.

The detailed construction of the wireline control head 7 may be seen to better advantage in Figure 5. Control head 7 comprises a cylindrical body member 14, the upper or low pressure end and the lower or high pressure end portions of which are externally threaded. Within body member 14 are disposed a downwardly extending flow tube 15, a line wiper member 16, and a retainer bushing 17 adapted to withstand upward thrust of the line wiper member 16. Retainer bushing 17 has an outwardly extending, annular shoulder 18 held in engagement with the upper end of body member 14 by an internally threaded coupling sleeve 19 which makes threaded connection with the before-mentioned upper externally threaded portion of the body member 14. Into the upper internally threaded end of sleeve 19 is threaded a spray guard body 12, in which is held a disc-shaped spray guard rubber 13. The spray guard body 12, top of retaining bushing 17 and the interconnecting coupling sleeve define a spray collecting chamber 45. The chamber 45 is provided with a threaded outlet port 44 to which is connected a spray drain line 46 which leads to suitable apparatus for retaining the fluid passing out through it or returning it to the well. The lower end of the body member 14 makes threaded connection at the beforementioned externally threaded portion thereof, to the upper end of the beforementioned quick release clamp 8.

The flow tube 15 is constructed in such a manner as to provide an elongated axial passage or bore 23 through which, in operation, the wireline or cable 11 passes relatively freely, with an annular clearance space between the wireline or cable 11 and the inside surface of the walls of the bore 23 of such diametral and longitudinal dimensions as to permit free or relatively frictionless movement of the wireline or cable therethrough while at the same time permitting escape or blow-by through the annular space of a limited, controlled amount of fluid from the well.

It has been found that the bore 23 should be of such diameter as to provide an annular clearance around the cable of the order of .01–.02 inch, defining, as before-described, a restricted annular blow-by control passage for gas or well fluids. This clearance has been shown in exaggerated scale in the drawings for ease of illustration. As wear occurs from continued use, the clearance between the flow tube and the line may increase, so that the annular blow-by control passage may become somewhat enlarged. If the clearance becomes too great, the tube may be replaced.

At spaced intervals along the length of the flow tube 15, the bore 23 is preferably expanded or counterbored to provide a plurality of annular turbulence chambers 24. As illustrated in Figures 5 and 7, chambers 24 are of modified conical shape with each chamber having upper and lower downwardly converging truncated conical internal end wall surfaces 26 and 25 respectively of substantially equal minimum and maximum diameters, joined together at their ends of maximum diameter by an intermediate cylindrical wall surface 27. Abrupt transitions in volume are thereby formed between these adjacent chambers, which interfere with or prevent smooth flow of borehole fluid blow-by through the beforementioned annular clearance space, and thereby create a condition of turbulence. As the borehole fluid or gas enters a chamber, encountering an abrupt increase in the cross-sectional area of the conduit through which it passes, changes of direction and a reduction in velocity and pressure occur, with consequent turbulence. Such turbulence appears to provide an effective buffer for the incoming gases or liquids under pressure, so that a succession of reductions of pressure and velocities of flow result along the length of the annular clearance space through the tube from the lower or high pressure end to the upper or low pressure end thereof.

It has been discovered that for the range of pressures encountered in most wells, satisfactory results can be obtained with flow tubes ranging in length from eight inches to fifteen inches. Eight to ten turbulence chambers 24 may be incorporated in flow tubes of these general dimensions with further improved results.

Flow tube 15 is of increased diameter near its upper end to form a flow tube head portion 29. The head portion 29 is retained within an expanded section 30 and at an intermediate portion of the bore formed in the body member 14 by suitable means including a screw plug 31 which is threaded laterally through the wall of the body member 14, and engages an annular recess or groove 32 formed around the outer surface of the head portion 29. Alternatively, the flow tube may be held against upward axial movement solely by the engagement of the marginal portion of the upper end surface of head portion 29, with a snap ring 33 which fits into an internal annular groove cut in the inner wall of the body member 14, as shown in Figure 7.

The annular recess 32 communicates with central bore 23 of the flow tube 15 by means of a plurality of laterally extending passages 34, which may be normal to the axis of bore 23, oblique thereto, or both. The passages 34 and annular recess 32 together define a collection chamber 35 within the head portion 29 of the flow tube surrounding line 11. A discharge line 21 makes threaded connection through the wall of the body member 14 at an intermediate point therein such that it communicates with the annular groove 32 around the head portion 19 and thence communicates through the beforedescribed lateral passages 34 to the central bore of the flow tube 15. In the discharge line 21 is disposed a control valve 22 which, by throttling the discharge fluid flow from tube 15, and through lines 21 and 47, fluid pressure may be caused to build up between the upper end of the head 19 and the lower surface of the line wiper member 16, whereby controlled gripping and packing-off force may be applied around line 11 as hereinafter more fully described.

Under conditions of substantial well pressure, even though enough force is exerted axially of the line wiper to hold the line securely in place, there may still be a small flow through the interstices between the strands of a conventional stranded cable. This material sprays out of the cable, once it progresses past the line rubbers and retaining bushing 17. It is caught by the spray guard rubber 13, and bled off through a port 44 from a spray collecting chamber 45 defined within sleeve 19. Port 44 communicates through a spray drain line 46 with suitable apparatus for retaining it, or for again introducing the collected material into the wellhead through suitable pumping equipment. Such equipment is not shown, but may be of conventional design. A similar system may be used to return fluid to the wellhead from the control valve 22 through the main fluid return line 47.

In an alternative embodiment of the flow-tube as shown in Figure 7, a collection chamber 36 of modified form is used, having a shape similar to that of the before-described individual turbulence chambers 24, but of greater size. In this latter form, the borehole fluid reaching the collection chamber 36 travels from the collection chamber 36 to the annular recess 32 through a plurality of radial ports 37. In either case, that portion of the flow tube head 29 in which the collecting chamber is formed is isolated axially by means such as a pair of longitudinally spaced O-rings. These rings are positioned around about the lower end of the head portion 29 at 38, and about the upper exit end at 39, in suitable annular recesses 40 and 41, respectively, formed in the head portion 29. These seals serve primarily to prevent leakage of fluid along the clearence space between between the exterior surface of the head member 19 and the interior surface of the body member 14 into the annular recess 32 under such differential pressure as exists throughout the length of the flow tube 15.

The principal reason for such confinement is to make fully effective the pressure control exerted by valve 22 against the lower surface of the line wiper 16 as hereinafter described. The line wiper 16 is held against downward axial movement by the snap ring 33, which also serves, in the before-mentioned alternative embodiment illustrated in Figure 7, to prevent upward movement of flow tube head portion 29. The design of the line wiper member 16 which is composed of resilient material such as rubber or neoprene or the like material is such that pressure applied to the lower surface thereof causes upward movement of the lower surface while the upper surface is retained motionless by the retaining bushing 17, resulting in longitudinal compression and resultant lateral expansion thereof into gripping and sealing engagement around the wireline or cable. The line wiper may be of conventional form, and may have a smooth passage for the wireline therethrough, or the passage may be provided with a plurality of internal, annular grooves, as shown in Figure 5, to provide a plurality of annular gripping surfaces for engagement with the line.

While the form of blow-by tube 15 shown in Figures 5–7 is preferred, a simplification is possible, particularly in those situations where gas is not a serious problem or pressures are relatively low. In such cases, the embodiment shown in Figure 9 may be utilized, in which the flow tube 51 has a central bore 42 of uniform diameter throughout its length with the plurality of turbulence chambers 24 shown in Figure 4 omitted. A collection chamber of the type shown at 35 in Figures 5 and 6 is then utilized. Alternatively, a chamber of the form shown at 36 in Figure 7 may be employed.

As illustrated in the several views, notably Figures 3, 4, 6 and 8, spray guard body 12, spray guard rubber 13, retainer bushing 17, wiper member 16 and flow tube 15 may all be split into two halves along their vertical axes for ease of assembly and disassembly about a wireline while in position within a well without necessitating the removal of the wireline from the well and removal of tools suspended thereon from connection with the wireline. The halves of the flow tube 15 are detachably fastened together by means of a plurality of bolts countersunk into the flow tube body as shown at 20 and both the flow tube and spray guard body are provided with aligning pins 50 to aid in rapidity and maintenance of accuracy of assembly of the several parts.

In a typical operation wherein apparatus such as a gun perforator or a well survey instrument or the like device is to be run into a well on a conductor cable, the cable head or rope socket (not shown) attached to the end of the cable, is first passed over the sheave 10 as shown at 11. The cable head and cable 11 are then passed through the two flow tube O-ring seals 38 and 39, through the coupling sleeve 19 and then through the control head body member 14. Next the two halves of the flow tube 15 are assembled together around the cable 11 at a location thereon above the body member 14 and secured together therearound by the bolts 20. The seal rings 38 and 39 are next installed into the annular seal ring grooves 40 and 41 around the head portion 29 of the flow tube 15 and the flow tube then inserted into the body member 14 to the position shown in Figure 5, where the lower annular shoulder of the flow tube head member 29 comes to rest upon the intermediate inner annular shoulder within the bore of the body member 14, and snap ring 33 is then installed to secure the flow tube in place.

Next the halves of the wiper member 16 and retainer bushing 17 are placed together around the cable 11 and inserted into the top of the body member 14, the marginal portion of the lower surface of the wiper member 16 coming to rest upon the before-mentioned snap ring 33. Following this the two halves of the splash guard body 12 together with the splash guard rubber 13 are assembled around the cable 11 and screwed into the top of the coupling sleeve 19, to complete the assembly of the main control head apparatus 7.

Following the foregoing assembly operations the apparatus or instrument to be lowered into the well is attached to the before-mentioned cable head or rope socket and inserted into the lubricator, the main valve 3 being previously closed against the well pressure. The control head is next connected to the top of the lubricator 5 by means of the quick release clamp connection 8. Discharge line 21 and spray drain line 46 are then connected to the control head to complete the assembly, as shown in Figure 5, ready for operation.

In operation, following the hereinbefore described assembly operations, the main valve 3 is opened, thereby permitting well fluid to enter and equalize the pressure in the lubricator 5 with that in the well head. The apparatus or instrument is then lowered on the cable from the lubricator into the well.

Normally while lowering the instrument and cable into the well as before-described, the control valve 22 is maintained fully open. Under such condition a relatively small controlled quantity of well fluid blows by the cable, through the flow tube 15, which is collected in the collecting chamber 35 at the top of the flow tube head member 29 and is immediately discharged through line 21, valve 22 and line 47, thereby maintaining the pressure on the lower surface of the wiper member 16 substantially at atmospheric pressure. Under this latter condition no squeezing force is applied to the cable 11 by the wiper member 16 and hence the movement of the cable 11 through the control head 7 into or out of the well is substantially frictionless.

In event it becomes desirable or necessary to apply a gripping or braking force to the cable either to control the movement of the cable into the well or to prevent uncontrolled expulsion thereof from the well during withdrawal operations, the valve 22 may be adjusted to throttle the fluid discharge therefrom so as to apply any desired pressure to the bottom surface of the wiper member 16 from atmospheric pressure when the valve 22 is fully open, to the full well fluid pressure when valve 22 is fully closed. Action of the wiper member 16 is thus controlled to permit substantially frictionless movement of the cable or to apply any required frictional or gripping force thereto.

The wiper 16 and spray guard 13 also cooperate in such a way that the device may be advantageously used, when there is no formation pressure in the well, with large cable to eliminate the objectionable spray of well fluid from the top of the lubricator during the retrieving of a tool, such as a swab.

Advantages of the apparatus of this invention are that it permits the running into wells under a given well pressure with less weight than has heretofore been required. This permits the elimination of some or all sinker bars which in turn permits use of a considerably shorter lubricator. Additional advantages resulting from this invention are that it minimizes the need for elaborate and expensive cable feed-in devices to force the cable into the well and also reduces cable damage and wear.

For convenience of description herein, the relative spatial locations of certain of the elements of the apparatus have been expressed with reference to the vertical, such as, for example, the upper or lower end or surface of certain apparatus elements, but this is not to be limiting as to the actual positions of such apparatus relative to the vertical, as obviously such mode of description is for the purpose only of establishing the positions of such described elements relative to one another.

The foregoing is illustrative only and is not to be considered as limiting, but shall cover all modifications within the skill of the art and the scope of the appended claims.

What is claimed is:

1. A control device for use with an elongated element that is to be inserted into or removed from a zone of higher fluid pressure, comprising: a tubular body member having a coaxial bore therethrough and having a lower end adapted to be connected to said zone with said elongated element adapted to extend through said bore; an elongated flow tube coaxially positioned in and making fluid tight connection with the bore of said body member, the upper end of said flow tube being located and fixed against longitudinal movement at an intermediate section of said bore of said body member; an elongated coaxial bore formed through said flow tube, said bore having an inside diameter adapted to make a close but substantially frictionless fit around said elongated element when the latter is run therethrough into or out of said zone; laterally extending passage means formed in said flow tube communicating with the upper portion of said coaxial bore; a retainer bushing fixed in the bore of said tubular body member at a point spaced above the upper end of said flow tube with said bushing member being coaxially formed with an opening through which said elongated element is adapted to extend; an annular resilient body coaxially interposed in the bore of said body member between the upper portion of said flow tube and the lower portion of said retainer bushing, said resilient body having an outside diameter substantially equal to the inside diameter of the bore of said body member and having a central passage coaxial with the bore of said flow tube and of such inside diameter as to normally make a close but substantially frictionless fit around said elongated element, the lower surface of said resilient annular body being in communication with the bore of said flow tube whereby pressurized fluid from said zone will apply an upwardly-directed force thereagainst so as to effect radially inward compression of the material of said resilient body and thereby reduce the diameter of its central passage until the material surrounding said passage exerts a gripping force on said elongated element; a fluid-collecting chamber on the upper end of said body member, said chamber being defined in part by a horizontal wall coaxially formed with an opening through which said elongated element is adapted to be extended; a first discharge passage extending from said body member for discharging fluid from said zone reaching said fluid-collecting chamber by passage along said elongated element; and a second fluid discharge passage extending from said body member and communicating with the laterally extending passage means of said flow tube.

2. A device as set forth in claim 1 wherein a control valve is disposed in said second fluid discharge passage for controlling the fluid flow therethrough.

3. A device as set forth in claim 1 wherein the bore of said flow tube is formed with a plurality of longitudinally spaced portions of increased diameter.

4. A device as set forth in claim 2 wherein the bore of said flow tube is formed with a plurality of longitudinally spaced portions of increased diameter.

5. A control device for use with an elongated element that is to be inserted into or removed from a zone of higher fluid pressure, comprising: a housing formed with a longitudinal passage therethrough, adapted to be connected with and exposed at one end to the fluid pressure in said zone, said elongated element thereby being adapted to extend through said passage into said zone; a rigid flow member longitudinally disposed in said passage and closing said passage to fluid flow therethrough between said flow member and said housing, said flow member having an elongated, longitudinally extending bore formed therethrough having an inside diameter adapted to make a close but substantially frictionless fit around such elongated element, said fit and the length of said bore being such as to permit a restricted, limited flow of fluid therethrough past said elongated element from said zone when said elongated element is in said bore and said housing is connected to said zone, fluid discharge passage means communicating laterally with said bore adjacent the end thereof remote from said zone; a resilient wiper in said longitudinal passage adjacent the end of said flow member remote from said zone, said wiper being formed with an opening for extension of said elongated element therethrough, the inside diameter of said opening being such as normally to make a close but substantially frictionless fit around such elongated element; discharge port means formed through said housing adjacent the end of said flow member remote from said zone and communicating with said fluid discharge passage means; conduit means for discharging fluid reaching said discharge port means from said zone by flowing along said elongated element through said laterally extending passage means; and means connected to said conduit operable to throttle outward flow of fluid from said discharge port means and thereby cause and control the application of gripping force by said wiper upon said elongated element.

6. A device as set forth in claim 5 wherein said housing is provided with a fluid collection chamber located on the side of said wiper remote from said zone and through which said elongated element is adapted to extend, and said housing also having means for discharging fluid reaching said fluid collection chamber from said zone by flowing along said elongated element and past said wiper.

7. A device as set forth in claim 5 wherein the bore of said flow member is formed with a plurality of longitudinally spaced-apart portions of increased inside diameter.

8. A control device for use with an elongated element that is to be inserted into or removed from a zone of higher fluid pressure, comprising: a housing formed with a longitudinal passage therethrough exposed at its lower end to said zone with said elongated element extending through said passage; a rigid flow tube longitudinally disposed in said passage and formed with an elongated, longitudinally extending bore extending therethrough having an inside diameter making a close but substantially frictionless fit around said elongated element, said fit and the length of said bore permitting a restricted, limited flow of fluid upwardly therethrough past said elongated element from said zone; fluid discharge passage means communicating laterally with said bore adjacent the upper end portion thereof; a resilient wiper in said longitudinal passage adjacent the upper end of said flow tube, said wiper being formed with an opening through which extends said elongated element, the diameter of said opening normally making a close but substantially frictionless fit around said elongated element; and means operable to resist outward flow of fluid from said discharge passage means and thereby vary the fluid pressure intermediate the upper end of the flow tube and the lower end of said resilient wiper to cause and to control the application of gripping force by said wiper upon said elongated element.

9. A device as set forth in claim 8 wherein said housing is formed with a fluid collection chamber above said wiper, with said elongated element extending therethrough, and said housing also having means for discharging fluid reaching said fluid collection chamber from said zone by flowing upwardly along said elongated element and past said wiper.

10. A device as set forth in claim 8 wherein the bore of said flow tube is formed with a plurality of vertically spaced-apart portions of increased inside diameter.

11. A device as set forth in claim 9 wherein the bore of said flow tube is formed with a plurality of vertically spaced-apart portions of increased inside diameter.

12. A control device for use with an elongated element that is to be inserted into or removed from a zone of higher fluid pressure, comprising: a housing formed with a longitudinal passage therethrough, adapted to be connected at one end to said zone, said elongated element being thereby adapted to extend through said passage into said zone; a rigid flow member longitudinally disposed in said passage and having an elongated, longitudinally extending bore formed therethrough having an inside diameter adapted to make a close but substantially frictionless fit around such elongated element, said fit and the length of said bore being such as to permit a restricted, limited flow of fluid therethrough past said elongated element from said zone when said elongated element is in said bore and said housing is connected to said zone; and fluid discharge passage means communicating laterally with the portion of said bore remote from said zone for connection with a region normally of lower pressure than said zone.

13. A control device as set forth in claim 12 wherein valve means is connected with said fluid discharge means for throttling outward flow of fluid from said fluid discharge passage means.

14. A control device for use with an elongated element that is to be inserted into or removed from a zone of higher fluid pressure, comprising: a housing formed with a longitudinal passage therethrough adapted to be connected with and exposed at one end to the fluid pressure in said zone, said elongated element thereby being adapted to extend through said passage into said zone; a rigid flow member longitudinally disposed in said passage in said housing and closing said passage to fluid flow therethrough between said flow member and said housing, said flow member having an elongated, longitudinally extending bore formed therethrough having an inside diameter adapted to make a close but substantially frictionless fit around such elongated element, said fit and the length of said bore being such as to permit a restricted, limited flow of fluid therethrough past such elongated element from said zone when such elongated element is in said bore and said housing is connected to said zone; and fluid discharge passage means communicating laterally with the end portion of said bore remote from said zone for connecting said portion of said bore with a region normally of lower pressure than said zone.

15. A control device for use with an elongated element that is to be inserted into or removed from a zone of higher fluid pressure, comprising: a housing formed with a longitudinal passage therethrough connected with and exposed at one end to the fluid pressure in said zone, said elongated element thereby extending through said passage into said zone; a rigid flow member longitudinally disposed in said passage in said housing and closing said passage to fluid flow therethrough between said flow member and said housing, said flow member having an elongated, longitudinally extending bore formed therethrough having an inside diameter making a close but substantially frictionless fit around such elongated element, said fit and the length of said bore being such as to permit a restricted, limited flow of fluid therethrough past such elongated element from said zone; and fluid discharge passage means communicating laterally with the end portion of said bore remote from said zone for connecting said portion of said bore with a region normally of lower pressure than said zone.

References Cited in the file of this patent
UNITED STATES PATENTS

| 1,390,793 | Kyle et al. | Sept. 13, 1921 |
| 1,709,949 | Rasmussen et al. | Apr. 23, 1929 |
| 2,176,323 | Bowen et al. | Oct. 17, 1939 |
| 2,555,145 | McKinney | May 29, 1951 |
| 2,670,225 | McKinney | Feb. 23, 1954 |
| 2,748,870 | Basham et al. | June 5, 1956 |

UNITED STATES PATENT OFFICE

CERTIFICATE OF CORRECTION

Patent No. 2,943,682

July 5, 1960

William H. Ingram, Jr., et al.

It is hereby certified that error appears in the above numbered patent requiring correction and that the said Letters Patent should read as corrected below.

In the drawings, Sheets 1 and 2, upper left-hand corner, the filing date, for "Filed July 31, 1956", each occurrence, read -- Filed January 31, 1956 --.

Signed and sealed this 31st day of January 1961.

(SEAL)
Attest:

KARL H. AXLINE
Attesting Officer

ROBERT C. WATSON
Commissioner of Patents